March 1, 1932. B. J. SCHWENDT ET AL 1,847,272
CONCRETE HOUSING FOR ELECTRICAL EQUIPMENT
Filed Sept. 18, 1929 3 Sheets-Sheet 1
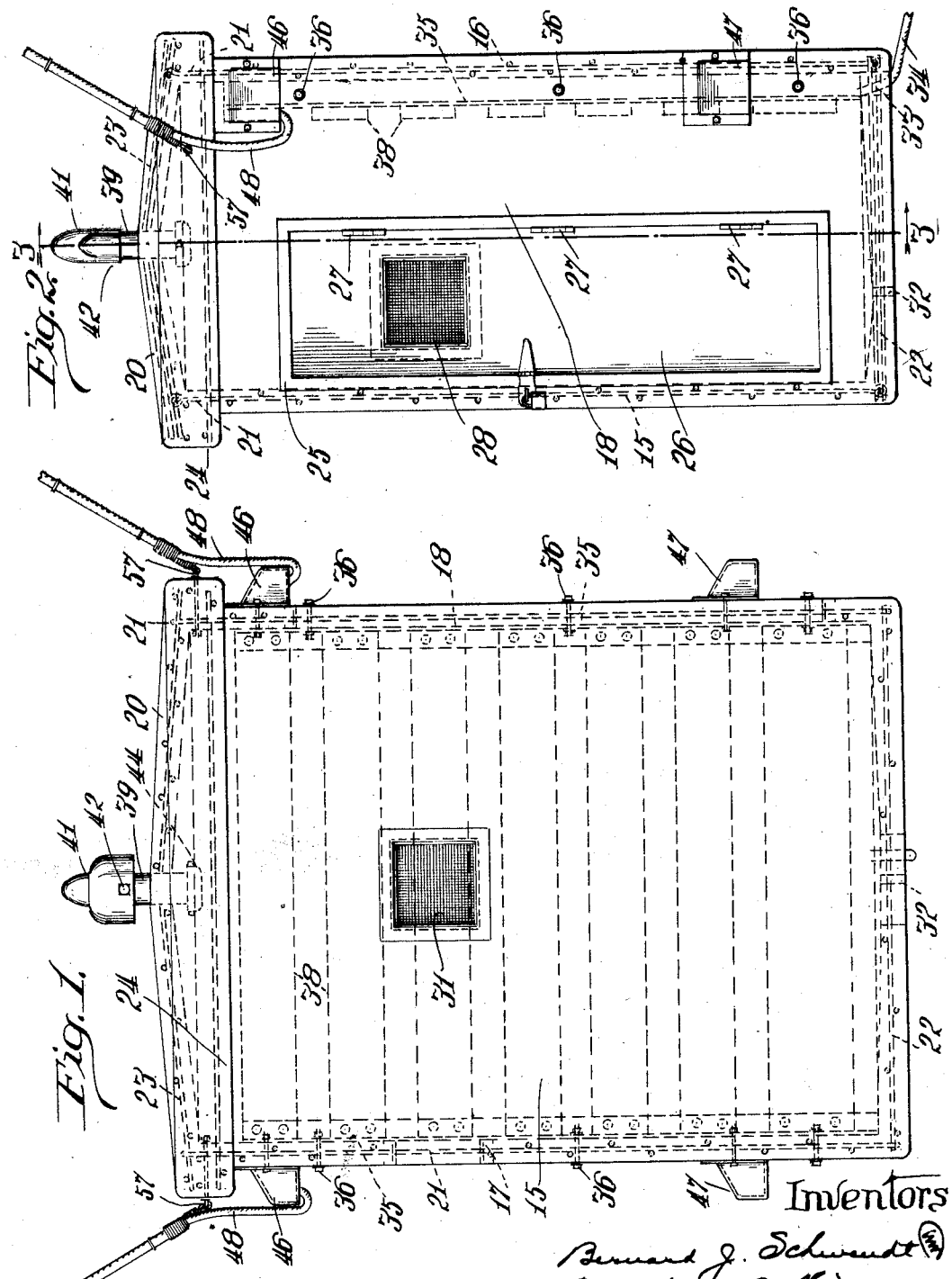

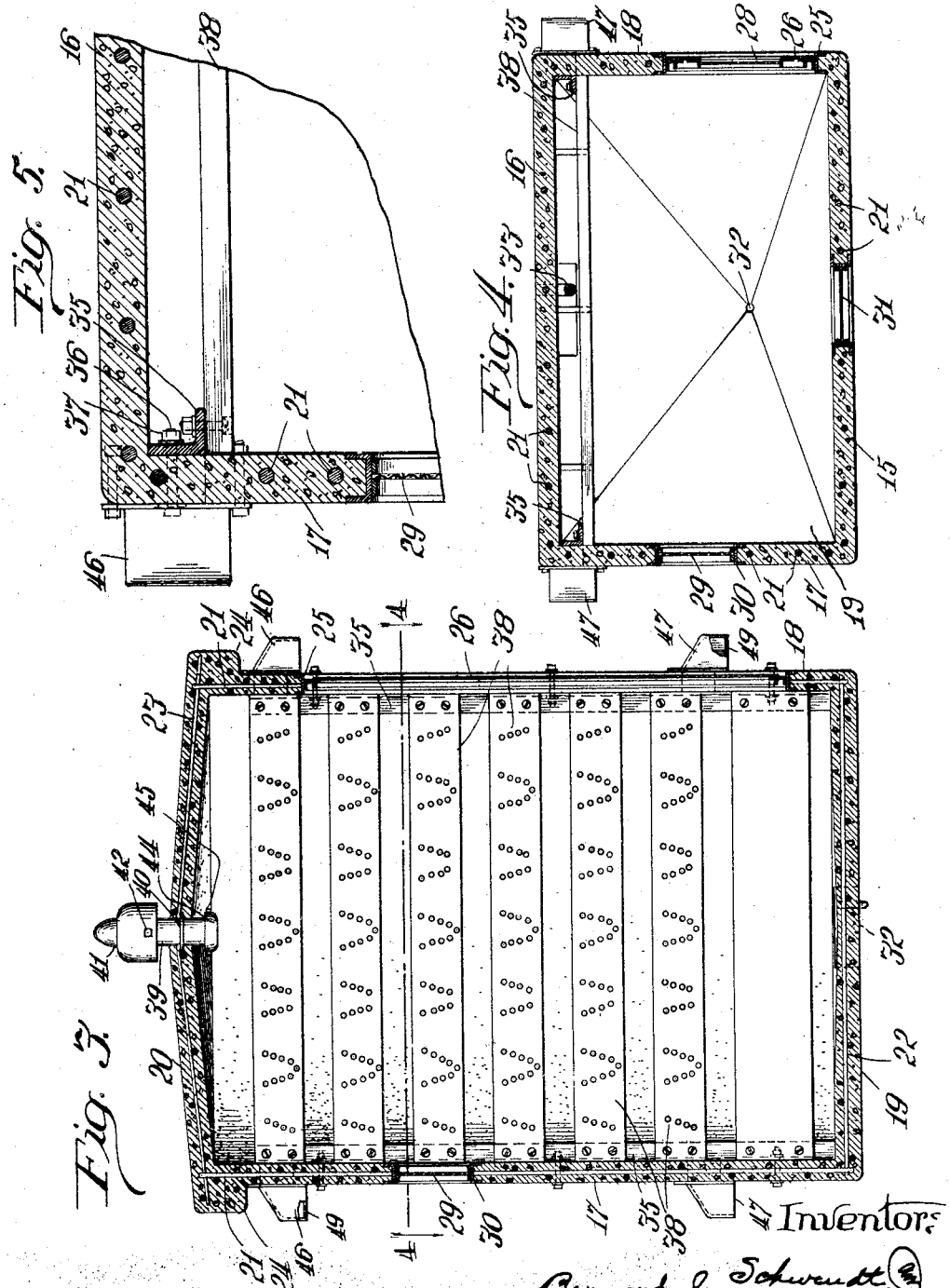

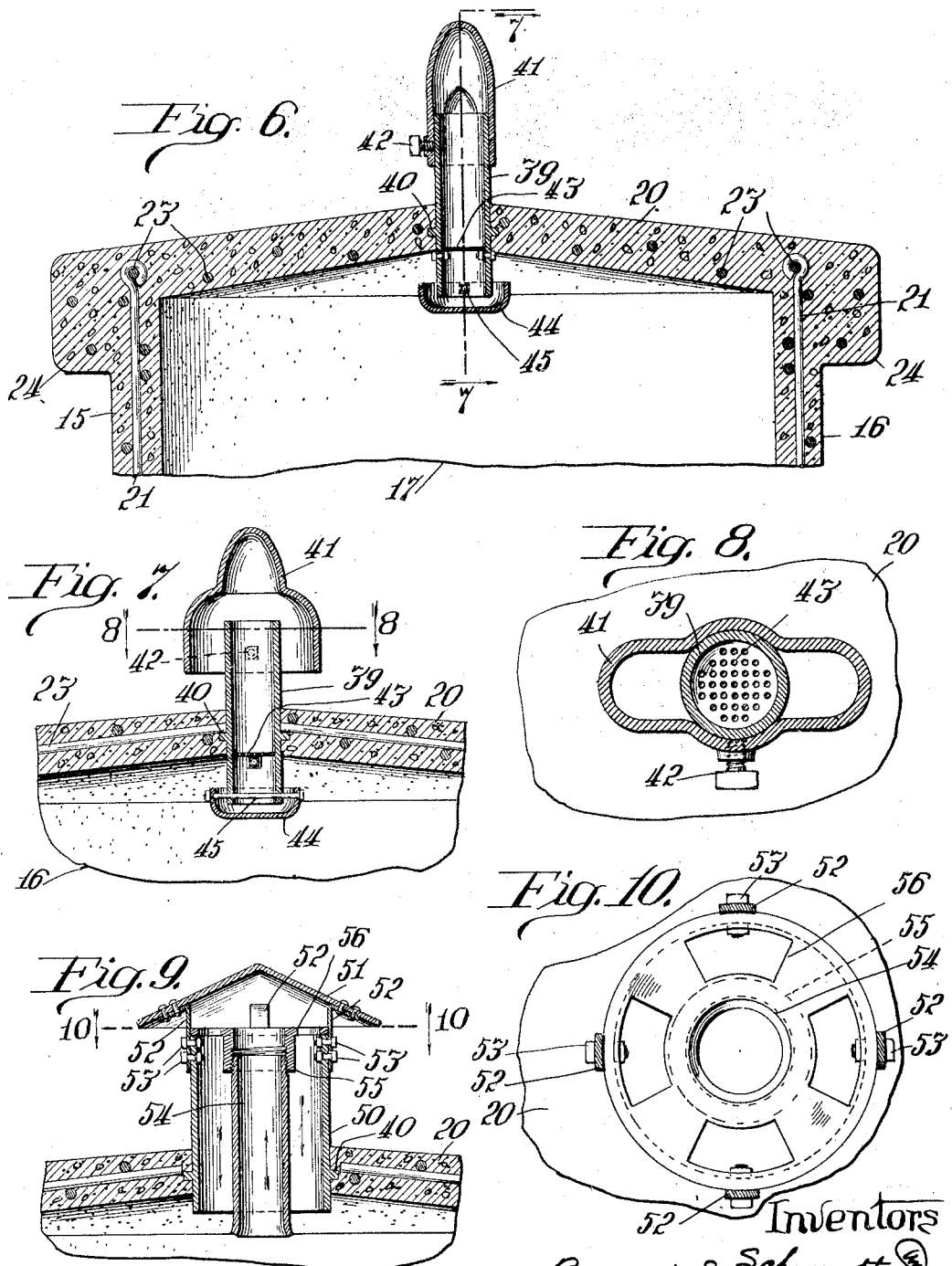

Patented Mar. 1, 1932

1,847,272

UNITED STATES PATENT OFFICE

BERNARD J. SCHWENDT, OF LAKEWOOD, AND FREDERICK B. WIEGAND, OF CLEVELAND, OHIO; SAID WIEGAND ASSIGNOR OF ONE-HALF OF HIS RIGHT TO OTTO S. FLATH, OF CHICAGO, ILLINOIS

CONCRETE HOUSING FOR ELECTRICAL EQUIPMENT

Application filed September 18, 1929. Serial No. 393,324.

Our invention relates to concrete housings for the signal apparatus and electrical equipments as employed by railroads; the housings being intended for use along the right-of-ways for the purpose of receiving the parkway cable lines or feed lines as well as the pole or aerial cables and to contain and provide relay supports within the housing to enable electrical connections to be effected for the various pole lines or aerial cables leading therefrom.

Our invention has for its object the provision of a monolithic structure, the installation and upkeep whereof may be made at a lower cost than has been the case with structures as heretofore employed; while at the same time providing a structure of a non-shrinking or non-warping character.

Another object of our invention is to provide a housing of the character described which is so constructed as to provide for proper ventilation and therefore to prevent and eliminate the difficulties that result from condensation and frosting.

A further object of our invention is to provide a housing whose side walls, top and bottom are preferably formed integral with reenforcing elements disposed from top to bottom and so arranged as to tie the roof and floor to the side walls and thus permit a more easy handling of the structure during its transportation and installation at the desired locality and thus provide for a more economical handling of the structure.

The above enumerated objects, as well as other advantages inherent in the invention, will all be more readily comprehended from the detailed description of the accompanying drawings, wherein—

Figure 1 is a side elevation of an embodiment of our invention with portions of the ingoing parkway cable and outgoing pole or aerial cables shown in place.

Figure 2 is a side elevation of our improved housing as viewed at right angles to Figure 1.

Figure 3 is a vertical sectional view taken substantially on the line 3—3 of Figure 2 looking in the direction of the arrows.

Figure 4 is a cross sectional view taken substantially on the line 4—4 of Figure 3 looking in the direction of the arrows.

Figure 5 is an enlarged cross sectional view of one of the corners of the housing as illustrated in Figure 4.

Figure 6 is a cross sectional view of the upper end or roof of the housing and of the top ventilator portion.

Figure 7 is a detail sectional view taken substantially on the line 7—7 of Figure 6 looking in the direction of the arrows.

Figure 8 is a cross sectional detail view taken substantially on the line 8—8 of Figure 7 looking in the direction of the arrows.

Figure 9 is a view similar to Figure 7 illustrating a modification of the top ventilator.

Figure 10 is a detail sectional view taken substantially on the line 10—10 of Figure 9 looking in the direction of the arrows.

The invention, as exemplified in the drawings, preferably comprises a housing preferably rectangular in cross-section, having front wall 15, rear wall 16 and two side walls 17 and 18, bottom or floor 19 and top or roof 20, see Figures 3 and 4. The walls, bottom and top are formed of reenforced concrete with the side walls provided with reenforcing elements extending from top to bottom, as for illustration the tie rods 21 whose ends may be given hook form, as shown in Figure 2 for the purpose of receiving or having the reenforcing rods 22 and 23 in the bottom and top secured thereto or disposed therethrough in order that a monolithic structure may be provided.

Thus a structure is provided wherein the bottom and top of the housing are not only integrally formed with the side walls, but are firmly secured thereto so that the housing may be lifted by means of suitable grappling irons or other means adapted to engage beneath the overhanging eaves 24 of the housing. It will be understood, of course, that in addition to the reenforcing elements or rods heretofore mentioned, the housing is provided in all of its walls, top and bottom, with a sufficient number of additional and transversely disposed reenforcing elements, as shown in the drawings so as to provide a structure possessing the required strength.

With our improved structure formed as shown and described, it is apparent that the housing may be cast at a convenient point and the entire structure may then be lifted, by suitable grappling means engaging beneath the eaves of the roof, onto a car for transportation to points along the right-of-way where installation is to be made; the complete structure or housing being in condition for use without further assembling except for the introduction of the parkway cable and pole lines or aerial cables which are to be lead into the housing.

One of the side walls, for example side wall 18, is provided with a door opening having a suitable framing, as for example the channel iron 25, see Figure 4, embedded or cast in the concrete for the purpose of having a suitable door 26 preferably hingedly secured thereto, as shown at 27 in Figure 2. The door 26 is preferably of sheet metal and also provided with a window as at 28 for proper light to enable the electrician to see train movements on the right-of-way while in the housing.

For this reason the opposite wall 17 which, like wall 18, is supposed to be disposed in a direction parallel with the right-of-way, is also provided with a window as at 29, see Figure 3, which is set into the metallic framing which may likewise be of suitable channel formation as at 30 embedded in the concrete.

The front wall 15 of the housing is also preferably provided with a window as at 31, thus providing sufficient light and vision.

The bottom or floor of the housing may be slightly dished on its inner upper surface, as shown in Figures 2 and 4, and at the bottom of the dished portion preferably provided with an outlet or drain as at 32 in Figure 4. The bottom, preferably adjacent to the rear wall 16 is also formed with an opening at 33 for introduction of the parkway cable, a portion whereof is shown at 34. The parkway cable opening is arranged in the bottom of the housing because in general practice the parkway cables along the right-of-way are either buried in the ground or lead along the ground. After the parkway cable has been introduced through the opening in the bottom of the housing, the opening about the cable is then filled with a sealing compound, which solidifies after having been poured in place, of a moisture resisting nature.

The side walls 17 and 18, adjacent to but preferably in spaced relation with the rear wall 16, are shown provided with angle bars 35, 35, shown extending substantially from top to bottom (see Figures 3, 4 and 5).

The angle bars 35 are held in place by a suitable number of bolts 36 having their heads embedded in the concrete while the threaded ends are disposed through the angle bars 35, 35 to receive nuts 37 whereby the angle bars are removably held in place.

The angle bars 35 are for the purpose of having a terminal board or shelf 38 secured thereto; namely a relay support which is preferably arranged in spaced relation with the rear wall of the housing in order to permit access to the rear of the support for wire handling, etc.

Our improved housing is provided with a moisture shedding roof or top 20 which at its crown and preferably at the median line is provided with a ventilator consisting of a conduit 39 which is preferably provided externally with a flange or lugs 40; the conduit with the lugs being preferably embedded in the concrete while the same is being molded or formed so as to firmly hold the ventilator conduit 39 in place with its outer end disposed sufficiently above the top of the roof while the lower end extends somewhat into the housing, as more clearly shown in Figures 6 and 7. The conduit 39 is of proper size or diameter to enable the desired air circulation and has its outer or upper end provided with a hood 41 which latter is preferably shown of somewhat oblong formation so that the two sides may come into close proximity or relation with the sides of the conduit 39 and be held in place in any suitable manner, as for example by the set-screw or bolt 42 thus enabling the hood to be removed should occasion require.

The other sides of the hood 41 are in spaced relation with the conduit 39, as shown in Figure 7, to enable free passage of air; it being understood that the hood 41 is made to depend beneath the top of the conduit 39.

The conduit 39 on its interior is shown provided with lugs or ribs for the purpose of supporting a perforated plate or screen 43 thereon; the screen being desirable to prevent ingress of birds or insects into the housing.

The inner lower end of the conduit 39 is also preferably provided with a suspended cup 44 of diameter larger than the diameter of the conduit and shown held in place by a pin or bolt 45 which extends through the side walls of the cup and conduit, as more clearly shown in Figure 7; the cup being adapted to catch any condensation which is likely to occur or form in the upper part or vent of the housing. The cup may be readily removed by removing the nut of the bolt 45 and withdrawing the bolt.

At suitable points the housing is provided with openings or outlets both for ventilation or air circulation and for passage of the wires or cables; the openings being all provided with coverings or hoods, as shown at 46, 46 and 47, 47; the hoods on the exterior of the housing being open at bottom for the ingress of air through the openings shielded thereby as well as for the passage of the pole lines or aerial cables shown for illustration at 48 in Figures 1 and 2; the cables, in the exemplification being shown entering through the vent hoods 46, 46 adjacent to the top of the housing.

In this case, the vent hoods 47, 47 are located adjacent to the bottom of the housing which in the exemplification are shown merely employed for the passage of air therethrough.

With the hooded openings, as shown and described, it is apparent that ingress of moisture in the nature of rain or snow is prevented; and in order to prevent the ingress of insects and the like these openings are preferably provided with screens, as at 49.

In Figures 9 and 10, we illustrate a modified form of the top ventilator, namely the ventilator which is located at the uppermost point in the roof of the housing. The ventilator, shown in Figures 9 and 10, comprises an outer conduit 50 of comparatively large dimensions and secured within the top 20 of the housing by means of the lips or flanges 40 similar to that previously described. The outer end or top of the conduit 50 is provided with a hood 51 adapted to overhang or extend beyond the sides of the conduit 50 and is supported in place by the spaced brackets 52 which are shown as preferably riveted to the hood or removably bolted to the conduit 50 by means of bolts, as at 53, in order that the hook may be attached in place after the inner air conveying conduit 54 has been put into position. The method of attaching the hood also permits it to be removed should occasion require. The inner conduit 54 is of smaller diameter than the outer conduit 50 so as to leave an air passage therebetween. The inner conduit 54 preferably extends slightly beneath the inner lower end of the outer conduit 50; with the inner lower end of conduit 54 preferably slightly flared, as shown in Figure 9.

This inner conduit 54 may be secured and held in place in any suitable manner, as for example by the band or collar 55 which may be threaded to receive the threaded upper end of the conduit 54 and the band held in place by a perforated bracket or spider as at 56, in order to provide a sufficient number of openings for passage of air.

The inner conduit support 56 may be secured to the outer conduit 50 in any suitable manner; as for example the spider or apertured plate 56 may rest on top of outer conduit 50 because it would be held against shifting by the brackets 52 which are disposed at spaced points about the outer conduit and are shown as preferably secured to the outside of conduit 50.

With the construction of ventilator shown in Figures 9 and 10, the outside air will pass down through one of the passages, while the air within the housing will flow outwardly through the other passage; for example, the air may enter the housing through the passage between the two conduits, while the air within the housing may pass outwardly through the inner conduit 54 as indicated by the arrows in Figure 9. With the vent openings in the side walls of the housing in conjunction with the ventilator at top, it is apparent that ample circulation of air through the housing will be had and therefore a better condition of the relays or electrical equipment within the housing maintained.

In order to properly anchor the cables in place, especially the pole or aerial lines, the top of the housing is provided with anchors 57, which may be in the nature of eye-bolts whose shanks are embedded in the concrete during the pouring so as to be securely held in place; the anchors being preferably arranged in the enlarged eave portion of the roof as shown in Figure 1.

The housing is provided with windows or sight-openings so arranged that the electrician may constantly and properly observe train movements while engaged in effecting the desired electrical connections within the housing.

The parkway cable entrance is preferably through the floor of the housing and made to provide sufficient space about the cable to be filled in with a moisture resisting sealing compound; and the lead-ins and lead-outs may both be at the bottom of the housing through the bottom side ventilator openings instead of adjacent to the top as shown, in which event the top hooded ventilator openings 46 would merely constitute ventilators for the housing.

Our improved monolithic electrical equipment housing provides for great economy in handling and installation, due to the fact that the roof and floor are integrally formed with the side walls, being reenforced and tied together, thus permitting the housing to be gripped beneath the overhanging eaves by suitable grappling hooks whereby the housing may be lifted from a car and set in place along the right-of-way.

At the same time the proper ventilation of the housing is quite essential for its use; while at the same time access to the equipment and observations as required are all provided for in a housing of great durability whereby the cost of up-keep encountered with present day constructions is practically eliminated.

The exemplifications of the invention are believed to be the simplest adaptations of the invention which have been described in terms employed merely as terms of description and not as terms of limitation, as structural modifications are possible and may be made without, however, departing from the spirit of our invention.

What we claim is:—

A monolithic electrical equipment housing of self sustaining character comprising integrally formed bottom, roof and side walls provided with reenforcing elements whereby the roof is tied to the side walls and to the bottom, said roof being extended beyond the side walls to provide grappling iron receiving portions; cable anchors embedded in the sides of said roof; openings in the side walls adjacent to the top and the bottom; hooded shields for certain of said openings, secured to the housing exterior, and open at bottom; a ventilating conduit cast in and disposed through the roof, said conduit having a surrounding flange embedded in the concrete; a covering for the outer end of the conduit supported in spaced relation therewith to permit circulation of air without admitting moisture; perforated means across the side wall openings and said conduit to prevent passage of objects therethrough; elements embedded in the side walls; terminal board supporting bars supported by said elements in spaced relation with the rear wall of the housing; an insulated terminal board secured to said bars so as to be disposed in spaced relation with the housing rear wall; and glazed sight openings in three side walls of the housing, one of said openings permitting ingress.

BERNARD J. SCHWENDT.
FREDERICK B. WIEGAND.